Patented July 26, 1927.

1,636,685

UNITED STATES PATENT OFFICE

CHARLES RAYMOND DOWNS, OF YONKERS, NEW YORK.

PRODUCTION OF CATALYST CARRIER.

No Drawing.   Application filed December 9, 1926.   Serial No. 153,734.

My invention relates to improvements in processes for the vapor phase catalytic oxidation of organic compounds to products of partial oxidation and has for its primary object the production of a novel catalyst carrier.

In the past various catalyst carriers have been proposed for this purpose such as grained aluminum, aluminum pellets, pumice, asbestos and the like. In the case of asbestos or other fibrous carriers it is difficult to fill the tubes of a tubular catalyst reaction vessel evenly without resulting in various degrees of packing in the various tubes and hence an uneven distribution of the reacting gases When this happens the tubes present varying resistances to gas flow which is undesirable. When pumice is used as a catalyst carrier there often takes place a reaction between the carrier and the catalyst resulting in a rapid depreciation in productivity of the catalyst mass when operating at the elevated temperatures ordinarily used for this purpose. Furthermore, the pumice granules are porous and the catalyst which is absorbed into the granules during the preparation is not sufficiently available for promoting the reaction as such reactions are largely a surface phenomena. Aluminum pellets and other forms of aluminum having smooth surfaces are objectionable because of the fact that the oxide catalysts, such as oxides of the metals of the fifth and sixth groups of the periodic table, do not adhere sufficiently well to such surfaces and dusting results which results in the removal of a substantial part of the catalyst from the catalyst mass and hence from its proper sphere of influence. Grained aluminum of a suitable screen size is made in its granulated form ordinarily by stirring a mass of molten aluminum at a temperature where solidification is taking place. Aluminum in this form possesses a rough, scraggy surface to which the oxide catalyst adheres well and does not absorb the catalyst into the interior of the individual particles, thus permitting high productivity of all the oxide catalyst present in the catalyst mass. It has in spite of these advantages certain limitations in that it is relatively expensive, its melting point is low and even at temperatures somewhat below its melting point it is not strong structurally. Recognizing the limitations of those materials heretofore used as catalyst carriers I have found that if iron particles of the desired size are treated by dipping in melted aluminum or tumbled with powdered aluminum at a temperature below the melting point of aluminum, catalyst carriers may be produced that have unusual advantages. The process of treating metals in this way is called calorizing. During this treatment there takes place an alloying action between the aluminum and iron and I have found that the surface so produced is catalytically inert in vapor phase catalytic reactions. That is, there is no deleterious reaction between the calorized surface and the catalyst oxide supported thereon nor is there any harmful effect on the gaseous reaction mixture. Moreover, in the process of depositing the catalysts on the carrier it is important that the carrier be unaffected by the solutions from which the catalysts are precipitated on the carrier. Unprotected iron granules are unsatisfactory for this latter reason and also because iron oxide in the catalyst mass tends to promote complete oxidation reactions which are of course to be avoided. The calorized surface is entirely satisfactory from these standpoints. The surface is moreover rough and therefore suitable for the catalyst oxides to cling tenaciously thereto. Another important advantage of calorized iron granules is that their melting point is far above any temperature at which these reactions take place.

For this purpose I may use cast iron of various compositions, Duriron or the other high silicon irons, steel pellets and especially prepared forms or scrap steel such as punchings, borings and the like, but no matter how smooth the iron surface may be a rough surface to which the catalysts will adhere is produced during the calorizing treatment. This flexibility as to the form of the catalyst carrier is not attainable when using catalyst carriers as known in the past.

Having now described my invention, I claim:

1. A catalyst carrier comprising particles of metallic iron coated with an iron aluminum alloy.

2. A catalyst carrier comprising particles of iron with an aluminum surface.

3. A catalyst carrier produced by calorizing particles of iron.

In testimony whereof, I hereby affix my signature.

CHARLES RAYMOND DOWNS.